Figure 2:
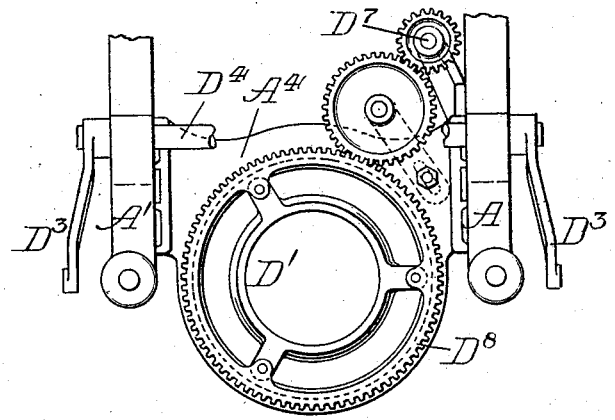

(No Model.) 3 Sheets—Sheet 1.
C. EICKEMEYER.
HAT STRETCHING MACHINE.
No. 576,099. Patented Feb. 2, 1897.
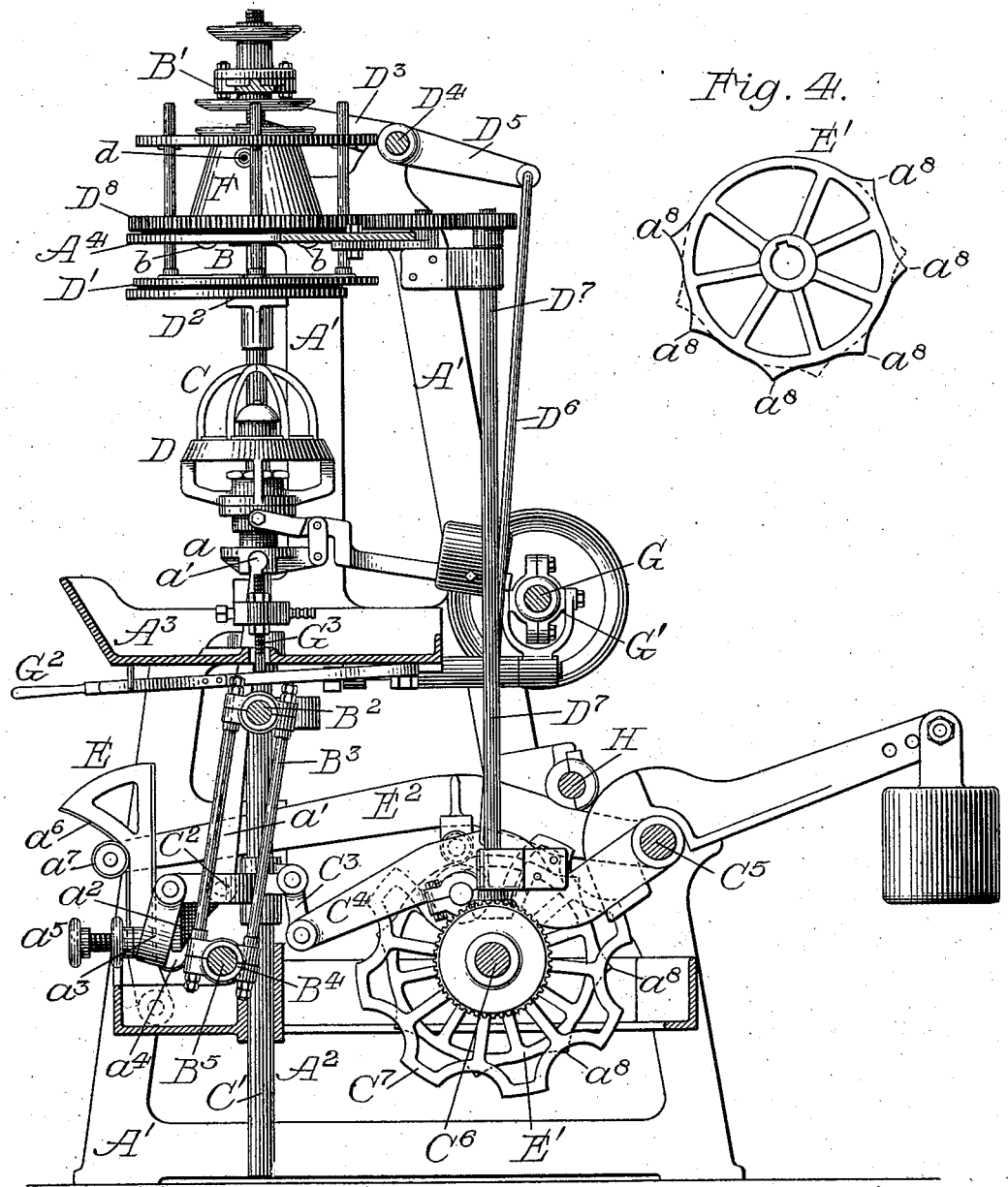
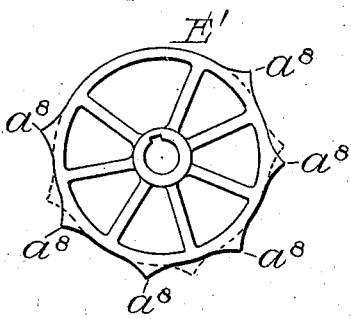
Attest: Howell Bartle. Emma E. Marks.
Inventor: Carl Eickemeyer, By his Attorney.

(No Model.)  3 Sheets—Sheet 2.

C. EICKEMEYER.
HAT STRETCHING MACHINE.

No. 576,099.  Patented Feb. 2, 1897.

Attest:
Howell Bantle
Emma C. Marks

Inventor:
Carl Eickemeyer
By M. B. Wood
Attorney (No Model.) 3 Sheets—Sheet 3.
C. EICKEMEYER.
HAT STRETCHING MACHINE.
No. 576,099. Patented Feb. 2, 1897.
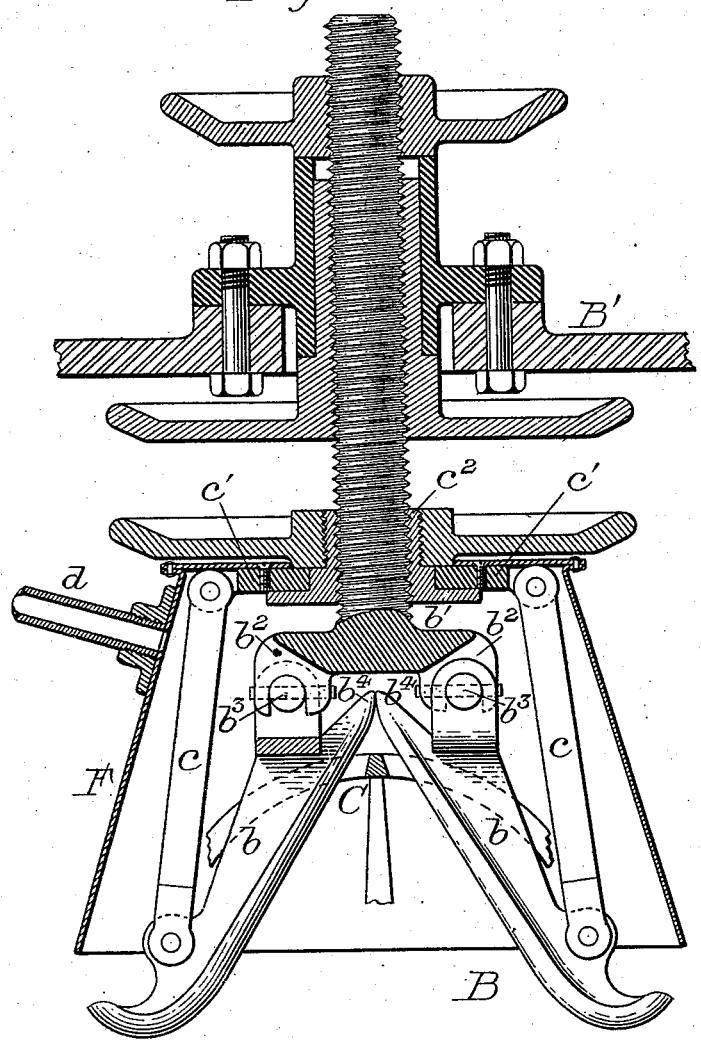
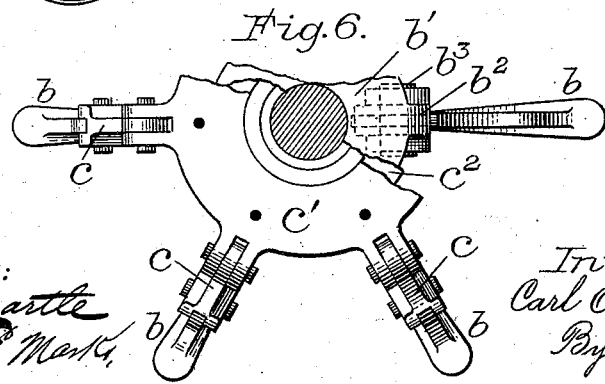

UNITED STATES PATENT OFFICE.

CARL EICKEMEYER, OF YONKERS, NEW YORK.

HAT-STRETCHING MACHINE.

SPECIFICATION forming part of Letters Patent No. 576,099, dated February 2, 1897.

Application filed August 28, 1896. Serial No. 604,153. (No model.)

*To all whom it may concern:*

Be it known that I, CARL EICKEMEYER, of Yonkers, in the county of Westchester and State of New York, have invented certain new and useful Improvements in Hat-Stretching Machines; and I do hereby declare that the following specification, taken in connection with the drawings furnished and forming a part of the same, is a clear, true, and complete description of the several features of my invention.

My said improvements relate exclusively to machines which are capable of automatically stretching the tips of hat-bodies, so that each machine may be operated by an attendant while operating not only an automatic brim-stretcher, but also an automatic blocker, the three machines being in simultaneous operation, and each only requiring that the attendant supply it with an appropriate hat-body, to then start it, and finally to remove the hat-body or hat from the machine.

So far as I know, the first automatic tip-stretching machine of this general class was devised by my father, the late Rudolf Eickemeyer, and the same was disclosed in United States Letters Patent issued to him April 11, 1882, No. 256,203. The second machine of this class was also devised by him, and it embodied some of the patented features of the first machine, together with many later improvements, to which Rudolf Eickemeyer, Jr., as the executor of my father's estate, has made lawful claim by an application filed in the United States Patent Office August 8, 1895, Serial No. 558,623.

Machines embodying my present invention contain features which were novel in each of said prior machines, as well as other novel features, which involve novel modes of operation of material value because they afford new and valuable results in hat-tip stretching.

In the first machine referred to provision was made for rotating the hat-clamping rings during the stretching operation, power being continuously applied to said rings. While that mode of operation was not then objectionable in working on certain heavy kinds of hat-bodies, the crown portions and tips of the lighter kinds were subjected to such torsional or twisting strains as to result in objectionable distortion, which defeated their introduction into extensive use. The second machines were so organized that the rotative action of the clamp was intermitting and only at such times as the hat-body was wholly free from adhesive contact with the "basket" or stretching-fingers and also free from the "star" or ribbed former with which said fingers coöperate. In this second machine each stretching-finger operated upon one line or portion of the hat-tip and then upon another similar line or portion after the next intermittent rotation of the hat-body and clamp, so that in working on delicate hat-bodies, for instance, the line action of the fingers left defacing traces thereof on the stretched tips, notwithstanding the partially successful attempt at obviating them by providing for a final decrease in the working pressure on the hat-tip between the ribbed former and the fingers during the closing moments of the stretching operation. In my efforts to obviate this objection I finally experimented with a continuously-rotated brim-clamp and then discovered that under the new conditions the results of its original objectionable torsional action could be eliminated. One new condition is that in the old machine the stretching-fingers were organized to be operated at from two hundred to three hundred vibrations per minute, while in the second and in my present machine they are organized so that their extent of vibrative movement is only about half what it was in the first machine and to be (and they are now) operated at from four hundred to five hundred vibrations or impulses per minute, and therefore the fingers and the ribbed former fail to obstruct the rotation of the hat-body at each vibrative action of the fingers less than one-half as much as they did in the first machine. Under this first new condition, with the stretching-fingers vibrating with about half the throw and nearly twice as rapidly as was provided for in my father's first machine, the agitation of the felt in the hat-tip is so complete and the average periods of heavy pressure between the fingers and the ribs of the former are so brief as to greatly reduce the frictional adhesion of the hat to said ribs, and hence with the continuous rotation of the hat-clamp as in my machine the liability of distorting the hat is largely eliminated during each of the progressive stretching periods, and while an absolutely fresh surface of felt might not always be presented to receive each impulse of each stretching-finger it would be practically impossible for the stretching-fingers to operate successively upon precisely the same portions of the felt, and the hat-body, too, cannot be distorted because the several stretching periods are separated by complete clearance of the hat-body.

Another new condition is that in the old machine the ribbed former was promptly lifted by its cam into coöperative relation with the stretching-fingers, and then gradually and continuously raised and there held until the stretching operation was completed, whereas in the second machine (as well as in my own with additional provisions) the ribbed former is intermittingly lifted and lowered several times during the stretching operation for assuring the intermitting complete release of the hat-body from frictional contact with the stretching-fingers and ribbed former. In following up this second new condition I have found by experiment that during the stretching period the intermitting dropping of the ribbed former and the corresponding lifting control of the brim-clamp and the brief releases of the hat-body may be reduced at least one-half as compared with the second machine, wherein six hat clearing or releasing actions were provided for in view of the restricted action of the intermittingly-rotated brim-clamp. In other words, with but three of such clearing actions during the operation of the stretching devices the clearance of the hat-body will be so effective as to admit of the continuous rotation of the clamp without liability of distorting the hat-body, and the stretching operation is therefore conducted more rapidly, in that less time is consumed in releasing actions and more time devoted to actual stretching duty.

A third new condition exists in that in the old machine the brim-clamp as a whole was movable vertically on its spindle only in response to the depressing action of the stretching-fingers and the weight of the upper clamping-ring and to the lifting action of a coöperating counterbalance-weight for the lower clamping-ring, whereas in the second machine (as well as in my own) the brim-clamp and the hat-body is positively lifted or detached from the ribbed former at each intermitting dropping of the ribbed former.

It will now be understood that the main feature of my invention consists in the combination, with rapidly-reciprocating stretching-fingers, of a ribbed former and means for intermittingly moving it vertically to and away from the stretching-fingers several times during each complete stretching operation, a hat-clamp and means which intermittingly control it for assuring complete successive releases of a hat-body from the ribbed former, and means for imparting to the hat-clamp a continuous rotative movement during the complete stretching operation, and it will also be understood that this novel organization involves novel modes of operation and affords the new and useful results indicated—viz., the avoidance of liability of distorting the hat-bodies encountered in the first machine, obviating line-marks in the tip by presenting continuously to the action of the stretching-fingers fresh portions of the hat-body instead of having the fingers successively operate upon one line or portion of the hat-body, as in the second machine, and also adapting the machine to work equally well upon all kinds of hat-bodies, from the dark, heavy, and stiff grades up to the lightest weight, lighest colored, and softest grades having but little stiffening, and finally performing the tip-stretching operation with greater rapidity and uniformity and with equal safety to delicate light hat-bodies and the strongest and heaviest.

Another feature of my invention is the combination, with the spindle which carries the ribbed former and its lifting-lever, of a cam having not only a series of abrupt lifting and lowering faces or notches, as in the second machine referred to, but a series of intermediate gradual lifting-faces, instead of simple carrying-faces or "dwells," as in said second machine. The successful presentation of a fresh portion of the felt to each successive vibrative action of each stretching-finger, as in my improved machine, results in more even and rapid stretching than when each portion of the felt is subjected to some fifteen to eighteen vibrative actions or impulses, as in the second machine, and in order that this capacity for rapid stretching action by the fingers in my machine may be made fully available the ribbed former is gradually lifted so as to properly coöperate with the fingers during each of several of the intervals between the above lifting and lowering actions referred to. Briefly stated, in comparison, the corresponding cam in the first machine provided for a continuous gradual lift of the ribbed former in passing from its lowest working position to its highest, and then maintaining said former at the highest position until the end of the stretching operation. The corresponding cam of the second machine referred to first carried the ribbed former at its lowest working position during, say, fifteen to eighteen impulses of the fingers, then dropped it and raised it again to and held it at a slightly-higher position, then dropped and raised it again still higher, and so on, in all four times, and then with two intervening drops and lifts the former was carried at the same height twice, and after another drop it was finally lifted to and carried at a slightly lesser height for enabling the fingers to do what they could in working out the line-creases in the hat-body. With my new cam, having no dwell-faces, but a gradual lift at several faces, the stretching is perfectly accomplished during the action of only four of the seven peripheral faces of the cam, so that with the other three faces I can provide for a gradual lowering of the ribbed former to within a short distance of its lowest working position, thus effectually enabling the fingers to eliminate all crease-lines from the hat-body and enable the felt to evenly readjust itself in its stretched condition.

Another feature of my invention consists in a novel construction and organization of the stretching-fingers or basket, whereby the center of the tip of the hat-body is freed from a slight protuberance, which results from the imperfect coöperation of the apex of the ribbed former with the inner ends of the tip-stretching fingers, as heretofore constructed. This unstretched protuberance involves more or less special manipulation for its elimination during subsequent operations on the hat-body which I now render unnecessary, because I have constructed the inner ends of the fingers and so hinged them to their hub or base that they present working surfaces so closely adjacent to and conforming with the apex of the ribbed former that the center of the tip receives its appropriate degree of stretching.

Another feature of my invention relates specially to the second machine referred to; and it consists in certain simple mechanism which enables the elimination from said machine of a complex set of rock-shafts, links, and levers therein employed as parts of intermediate mechanism between a suitable cam and the lower clamping-ring, between which and its coöperating upper ring a hat-body is clamped throughout the stretching operation. Another feature of my invention consists in housing the stretching-fingers within a steam-fed dome or bell, this being an entirely new feature in tip-stretching machines, said bell being so constructed and organized with the adjusting mechanism as to be equally effective regardless of variations in the adjustment of the fingers.

To more particularly describe my invention, I will refer to the accompanying three sheets of drawings, in which—

Figure 3:
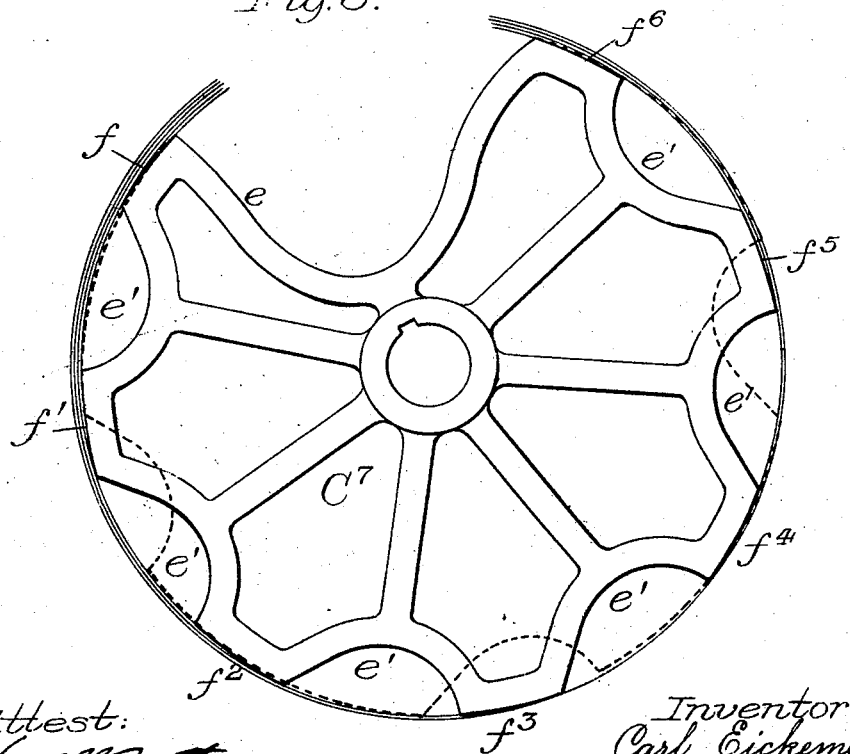

Figure 1 illustrates so much of one of my machines as is deemed necessary for the purposes of this specification with one of the side plates of the frame removed and with the bottom, middle, and cap plates in section, as is the case with the lateral shafting. Fig. 2 is a top view of the top plate of the frame, parts of the two side frames, the upper gearing for rotating the brim-clamp, and a rock-shaft and its arms, from which the upper clamping-ring is suspended. Fig. 3 is a side view of the cam which controls the spindle on which the ribbed former or basket is carried, with dotted lines indicating a modification in form which has been successfully and advantageously employed by me. Fig. 4 is a side view of the cam which actuates the hat-clamp in releasing a hat-body from the ribbed former and having dotted lines indicating a variation for coöperating with the dotted-line variation of Fig. 3. Fig. 5 is a sectional view of the stretching-fingers and the adjacent parts, including their novel steam-dome or heating-bell. Fig. 6 is a top view of a portion of said stretching-fingers, Fig. 5, without the heating-bell or dome.

As in prior machines, mine has two cast-iron side frame-plates A and A', a lateral plate $A^2$ near the bottom, a central lateral plate $A^3$, and near the top another lateral plate $A^4$, this having a central circular opening and affording a hub-support for a part of the hat-rotating mechanism. As in prior machines, the stretching devices consist of a ribbed former and coöperating stretching-fingers.

The basket or set of stretching-fingers B, although embodying novel features to be hereinafter fully described, is, as heretofore, suspended from a cross-head B', which, as heretofore, is carried on a pair of slidable rods (one shown) guided in the side plates in bearings (shown in Fig. 2) and coupled to a cross-head $B^2$, which in turn is coupled by a pair of rod pitmen, one of which is at $B^3$, to short-armed cranks at $B^4$ on the main or driving shaft at $B^5$, which for the best results should be so speeded as to impart to the basket or stretching-fingers four hundred or more vertical vibrative movements per minute.

The ribbed former or star C, like those in prior machines, has curved radial ribs for coöperating with the stretching-fingers. Only three sizes of former are necessary to provide for working on the several sizes of hats, because the stretching-fingers are so adjustable as to provide for so working with the three formers as to stretch the tips of all sizes of hats. This former C, is, as heretofore, firmly mounted upon a slidable spindle C', which is coupled at its cross-head $C^2$ by links $C^3$ to a counterweighted lever $C^4$ on a shaft $C^5$. Vertical movements are imparted to the spindle and ribbed former, as heretofore, by a cam on a counter-shaft $C^6$, but this spindle-cam $C^7$ involves novel features in construction, as will be hereinafter further described.

As in the prior machines the hat-brim clamp is composed of a lower clamping-ring D and an upper clamping-ring D', the two being constructed and organized, as heretofore, in what I have called the "second" machine, so as to properly clamp all sizes of hat-bodies, and also, as in said second machine, the upper clamping-ring is loosely carried on an annular cross-head $D^2$, coupled by two vertical links (not shown) to arms $D^3$ on a rock-shaft $D^4$ at the top of the machine, as shown in Fig. 2, and coupled to the spindle-lever $C^4$ by an arm $D^5$ and a link $D^6$, as shown in Fig. 1, so that with each full up-and-down movement of the spindle the upper clamping-ring will be fully lowered and raised oppositely to the full vertical movements of the spindle.

When the spindle is elevated and the ribbed former placed and maintained in coöperative relation to the stretching-fingers, the upper clamping-ring is therefore fully lowered, so that it is then released from its cross-head and carried freely upon and by the lower clamping-ring D, the brim portion of a hat-body to be stretched being firmly clamped between them.

The upper clamping-ring, as heretofore, has several vertical guide-rods, which carry near their tops an annular weight and also rotatively couple said ring to the operative mechanism by which it is rotated. Said operative mechanism, separately considered, is like that of the first prior machine hereinbefore referred to; and it consists of a bevel-gear on the shaft $C^6$, driving a vertical shaft $D^7$, geared at its top by way of a gear and an idler-gear to a toothed ring $D^8$, riding upon an annular hub or bearing on the top plate $A^4$ of the frame, said ring having holes through which the several guide-rods of the upper clamping-ring pass for rotatively coupling them together while admitting of free vertical movement by the clamping-ring $D'$.

The lower clamping-ring D, as in the second prior machine referred to, is concentrically arranged with reference to the ribbed former, and although it is carried and moved by and with the spindle it is rotative and also capable of independent vertical movements, it being freely rotative on a collar which is slidably mounted on a slidable sleeved cross-head and counterbalanced thereon by a weighted lever. The cross-head $a$ is coupled by a pair of links (one at $a'$) to an underlying bell-crank lever $a^2$, pivoted in the cross-head $C^2$ on the spindle $C'$. The cross-head $a$ has a pendent hinged yoke $a^3$, carrying at its lower end at one side a stud with a roller thereon at $a^4$, which has a rolling abutment against the edge of a vertical arm or lever E, pivoted at its foot to the lower lateral frame-plate $A^2$, so that while the lever E stands vertically the lower clamping-ring may move up and down with the spindle $C'$. The yoke $a^3$ is provided with an adjusting-screw $a^5$, which by abutting against the lower arm of the bell-crank lever $a^2$ enables the lower clamping-ring to be adjusted up or down with reference to the former for coöperating with the upper ring in properly clamping different sizes of hat-bodies, the position shown indicating a middle adjustment as for medium sizes. Now for lifting the brim-clamp so as to assure the complete release of a hat-body from the ribbed former during each intermitting drop and break in the stretching operation the lever E is inwardly actuated simultaneously with each brief drop of the spindle and former.

In the second machine hereinbefore referred to the lever at E is actuated by a cam on the shaft $C^6$ and intermediate mechanism consisting of a lever resting on the cam, a rock-shaft carrying a lever or arm, a link, a second rock-shaft having a vertical arm coupled to said arm by the link, and a pendent arm provided with a lateral pin which occupies a lateral vertical open slot in the vertical lever, which in that machine serves in the place of the lever E here shown.

Now in my machine I have obviated the use of the prior complex intermediate mechanism, with the attendant expense and liability of lost motion, by securing direct operative relations between the vertical lever E and the actuating-cam $E'$ by way of the cam-lever $E^2$.

My lever E is provided at its upper end at its outer edge with an outwardly-extended cam-face, as at $a^6$, and the cam-lever $E^2$, freely pivoted or hinged on the rock-shaft $C^5$ and having a pendent roll bearing on the cam $E'$, has also a roll $a^7$ at its free outer end in rolling contact with the cam-face $a^6$, so that when each spur $a^8$ on the cam, Figs. 1 and 4, lifts the cam-lever $E^2$ the lever E is thrown inwardly, causing a corresponding movement of the yoke $a^3$ and also of the lower portion of the bell-crank lever $a^2$, which lifts and supports the lower clamping-ring with the hat-body clamped between it and the upper clamping-ring, thus freeing the hat-body from the ribbed former at each of its short intermitting downward movements. The cam $E'$ is shaped somewhat unlike the corresponding cam in the second machine hereinbefore referred to. As shown in Fig. 1, the lifting and lowering faces or spurs $a^8$ are located so as to operate at the foot of each lowering face or notch of the spindle-cam $C^7$, whereas in my father's said second machine the spurs were located so as to operate just prior to the action of the corresponding lowering faces of the spindle-cam, and said spurs were much longer than mine and extended slightly beyond the peripheral line of the spindle-cam, but these differences are not specially material.

I have hereinbefore generally referred to my improvements in the set of stretching-fingers B, which I will now particularly describe with special reference to Figs. 5 and 6. Each individual stretching-finger $b$ is hinged to a hub $b'$, provided with a screw-threaded stem, the upper portion of which, with suitable wheel-nuts and a collar, afford means for adjustably but firmly mounting the fingers in a pendent position at any desired height upon the rapidly-reciprocated cross-head $B'$ before referred to. The hub $b'$ has a series of radial arms $b^2$, to which the fingers $b$ are hinged by means of yokes on the fingers and hinge-pins $b^3$, each of which is secured in place by a lateral pin, as clearly indicated.

Each finger $b$ is coupled by a hinged link $c$ to an annular plate $c'$, carried by a screw-threaded sleeeve $c^2$, mounted on the lower portion of the screw-threaded stem, so that, as heretofore, the rotation of the sleeve $c^2$ will adjust the fingers at different degrees of inclination for working on different sizes of hat-bodies. This set of fingers differs from any heretofore known to me, in that at the upper end of each the inner or working edge, as at $b^4$, is curved in the arc of a circle, of which the axis of its hinge-pin $b^3$ is the center, and said upper ends are closely grouped, so that in all of the positions of angular adjustment the upper ends of the fingers as a whole can and do uniformly maintain close relations to each other and afford an underlying space, which closely conforms to the apex of the ribbed former C and enables the center of the tip of a hat-body to be so fully worked or stretched over and around said apex as to obviate the central protuberance in the hat-tip, hereinbefore referred to, which is developed to a more or less degree by the use of each of the prior adjustable radial pendent stretching-fingers of which I have any knowledge. Another novel feature in connection with these stretching-fingers is the combination therewith of a steam dome or bell F, provided with a lateral nozzle at $d$ for the reception of the end of a flexible steam-pipe, (not shown,) and I have so shaped the dome and so mounted it on the annular plate $c'$ that it allows of the expansible adjustment of the fingers.

So far as I know I am the first to so apply steam to a hat-stretching machine that the steam and the resultant heat and moisture may be directed to and distributed among the stretching-fingers and over the exterior surface of the hat-body with which the fingers operatively engage. In several of my father's hat-stretching machines (as well as in my own) steam is applied to the interior of the hat-body by way of the spindle which carries the ribbed former, and in my father's automatic hat-blocking machine shown in Patent No. 540,219, dated May 28, 1895, (with which mine is adapted to operate in series,) a reciprocating banding-shell is supplied with steam so as to directly affect the working edge of the shell and the exterior surface of the hat, it being impracticable in such machines, as well as of no consequence, that the steam should be applied to the interior of the hat-body by way of the hat-block. In my machine the steam-dome, while fed with steam, not only performs the novel function of keeping the stretching-fingers hot and lubricating them with moisture, but when the dome is employed in connection with the feeding of steam by way of the spindle to the interior of the hat the rapid reciprocations of the dome with its puffing steam effects so causes the inner-fed steam to be held by the felt as to secure with uniformity both the heat and moisture well known to be necessary during the stretching operation.

I have hereinbefore stated that the spindle-cam $C^7$ involves novel features in construction, which will now be described in connection with Fig. 3. In this cam the initial lifting-face is at $e$ and it has six notches or abrupt dropping and lifting faces, as at $e'$, in each instance, as in my father's second automatic tip-stretching machine, hereinbefore referred to, but in his cam each intervening or peripheral face is concentric, and hence they are mere carrying-faces, and although through the first four faces each is higher than the other each maintains the ribbed former and the hat thereon at a certain height, whereas in my cam the peripheral faces are eccentric, and hence each is a gradual lifting-face. The initial lifting-face at $e$ of the cam carries the ribbed former into coöperative relations with the reciprocating stretching-fingers, whereupon the face $f$ gradually further lifts the former about one-eighth of an inch. Then after the first abrupt drop at the first notch $e'$ the next lift is to the height from which it was dropped, and then the peripheral face $f'$ gradually carries the ribbed-former and hat-body about one-eighth of an inch higher than before, and so on, increasing with each of the other peripheral faces $f^2$ and $f^3$, the spindle with the ribbed former then being at the highest point and at which time the main work of the stretching devices will have been completed. At the peripheral face $f^4$ the line of eccentricity is reversed, so that said face $f^4$ first supports the hat-body and former at the height to which it had been lifted by the face $f^3$, then gradually lowers it about one-eighth of an inch, and after the next abrupt lowering the face $f^5$, after first supporting the hat at its last previous height as before, gradually lowers it, the last face $f^6$ in like manner lowering the hat-body and former to a point about one-eighth of an inch higher than the point at which the stretching operation was begun under the control of the face $f$. The several concentric lines in Fig. 3 were employed merely for aiding the eye in appropriately following the eccentric working lines of the several peripheral faces, which are in fact portions of a double scroll-cam.

It is now to be understood that the stretching-fingers are reciprocated in my machine much more rapidly than in my father's first automatic tip-stretcher, hereinbefore referred to, and that in my machine the hat-body is completely freed from the action of the stretching devices (fingers and former) several times during the progressive stretching operation, and for those reasons I am enabled to apply rotative power continuously to the clamping-rings without liability of distorting the hat-body; also, having thus obviated said liability I am enabled to successfully employ the eccentric or scroll-cam action of my father's said first machine, (Patent No. 256,203,) and thus secure more rapid and effective stretching effects than with the said second machine, wherein the peripheral faces of the cam performed only maintaining or carrying duty.

The gradual lowering of the ribbed former and hat-body, as in my machine, coupled with the intermediate full release of the hat-body from the stretching devices, as in my father's said second machine, enables the stretching devices to not only surely eliminate line-marks from the felt, but it enables the body of the felt to evenly readjust itself from a necessary overstretched to its properly stretched and expanded condition, the action of the fingers being very rapid and successively lighter and lighter, as in such jiggering action as is desirable and effective in all felting operations.

It is not to be understood that the spindle-cam must have any particular number of notches $e'$, so long as the notches with the corresponding spurs $a^3$ of the brim-clamp cam $E'$ are sufficient in number for securing such an intermitting and proper clearance of the hat-body from the stretching devices as will prevent the constantly-operating hat-rotative mechanism from twisting and distorting the hat-body.

In dotted lines in Figs. 3 and 4, respectively, I have indicated the outlines of cams which I have employed for controlling the former-spindle $C'$ and the vertical movements of the hat-clamp with results equal to and in some respects better than those derived from the use of the six-notched cam $C^7$ and the cam $E'$. The said dotted-line form of the modified cam $C^7$ has three long gradual lifting-faces and but three notches like $e$, and the modification of the cam $E'$ has but three spurs, which are arranged to operate in time with the drop-notches of the other cam. With three such gradual lifting peripheral faces and the two intervening notches and with such a clamp-cam the clearance of the hat is fully effected for enabling the hat-rotating mechanism to operate without liability of distorting the hat.

With the three-notched cam more time is devoted to actual stretching during each rotation than with the six-notched cam, and the progressive action of three of the faces results in such complete stretching that the fourth or last face can be wholly utilized for eliminating line-marks and assuring the desired readjustment of the felt.

For indicating to those not familiar with such machines the manner in which the driving power is applied, distributed, and controlled in my machine I will state that as heretofore power is initially applied to the main shaft $B^5$, which (although not shown) is provided with a balance-wheel in view of the high speed at which the stretching-fingers are reciprocated. The main shaft is belted by way of cone-pulleys (not shown) to the upper or clutch shaft G, which, as heretofore, has a spring-clutch at $G'$, a starting-lever at $G^2$, which when set is in the path of a vertical stop-pin $G^3$, carried on a lateral bracket by the spindle $C'$, so that after starting the machine by releasing the clutch-lever all but the reciprocating fingers will be stopped by the release of the clutch-lever after each complete stretching operation, concluding when the cam $C^7$ fully lowers the spindle. The clutch-shaft is geared to an underlying idler-shaft H, which in turn is geared to the slowly-driven cam-shaft $C^6$, one complete rotation of which assures the proper stretching of a hat-body in about twenty seconds. Steam for the dome and former is controlled, as heretofore, by way of stop-cocks, (not shown,) which are automatically opened and closed by operative connections with a lever controlled by way of the cam-shaft at each complete lifting and lowering of the spindle $C'$.

With power applied to the main shaft of the machine the fingers B, rapidly reciprocated, as described, and the clutch-shaft in motion, all other working parts of the machine being at rest and in the positions shown, the attendant places a hat-body, properly wet and heated, over the ribbed former C and evenly upon the lower clamping-ring D, and then he releases the clutch-lever $G^2$ from the top pin, permitting it to occupy its working position, whereupon the cam-shaft $C^6$ begins to rotate and the spindle $C'$ commences to rise, lifting the former C and the lower clamping-ring, and simultaneously lowering the upper clamping-ring $D'$, which clamps the brim portion of the hat-body, and, by its weight overcoming the counterweight of the lower ring, forces the hat-body well upon the ribbed former before the latter reaches the position at which the reciprocating fingers engage with the hat-body. The stretching-fingers having begun their operation and the hat-clamp being slowly rotated, the ribbed former and hat-body are slowly forced upwardly by the first peripheral face of the cam $C^7$, and then the first notch in said cam abruptly drops the ribbed former, one of the spurs on the cam $E'$ then acting for forcing the top of the vertical abutment-lever E inwardly and lifting both clamping-rings and the hat-body, thus effecting a brief but complete clearance of the hat-body from the stretching devices, this being followed by a forcible return of the hat-body to the ribbed former, due to the downward action of the clamp and the next short quick lift of the ribbed former. These movements in the machine shown are twice more repeated, the ribbed former and the hat being each time gradually forced upwardly from the point occupied at the time of the last preceding drop, and after these four intermitting gradual lifts there are three similarly short abrupt lowering and lifting movements of the hat-body with appropriate movements of the hat-clamp, and between each of these abrupt intermitting movements the hat-body, properly clamped, supported, and rotated, is gradually lowered for enabling the stretching-fingers to operate with less and less forcible contact with the tip and to eliminate the line-marks while perfecting the stretching operation, after which the spindle is fully dropped and the stop motion operated, the upper clamping-ring having been again lifted to its normal position of rest and the stretched hat-body ready for removal, the whole operation occupying about twenty seconds.

With the machine modified only by the variation in the cams C⁷ and E', which I have employed as described, the mode of operation is the same as in the machine, Fig. 1, excepting as to the lesser number of intermitting abrupt drops and lifts, and the longer periods of gradually raising the ribbed former and gradually forcing the hat-body within the range of operation by the stretching-fingers.

Having thus described my invention, I claim as new and desire to secure by Letters Patent—

1. In an automatic hat-tip-stretching machine, the combination, substantially as hereinbefore described, with tip-stretching fingers and means for rapidly reciprocating them; a ribbed former coöperating with said fingers as a portion of the stretching devices; a constantly-rotative brim-clamp which engages with a hat-body interposed between the ribbed former and the fingers, and mechanism which lifts or controls the clamp and lowers the ribbed former intermittingly during the stretching operation, for briefly releasing the hat-body from the action of the stretching devices and obviating liability of distortion of the hat-body by the constant rotation of the brim-clamp.

2. In an automatic hat-tip-stretching machine, the combination substantially as hereinbefore described, of the tip-stretching devices, consisting of the vibrative stretching-fingers and the ribbed former; a constantly-rotative brim-clamp; a notched cam which during the stretching operation progressively lifts the ribbed former into coöperating relations with the stretching-fingers and intermittingly lowers said former, and a cam which lifts or controls the brim-clamp for releasing the hat-body from the stretching devices and enables the clamp to constantly operate for rotating a hat-body during the entire stretching operation without liability of distorting the hat-body.

3. In an automatic hat-tip-stretching machine, the combination with a rotative hat-clamp, of rapidly-vibrative stretching-fingers, a ribbed former, and a cam having a series of lifting-faces which gradually raise the ribbed former into closer relations with the stretching-fingers, and having a notch between each two of said faces which briefly drop and raise the ribbed former from and to its working position, and also having faces which gradually lower the ribbed former while still coöperating with the stretching-fingers, and still further having other notches for briefly dropping and raising said ribbed former during said gradual lowering, and means for causing the clamp to release the hat-body from the ribbed former, at each of the brief dropping movements, substantially as described.

4. In a hat-tip-stretching machine, the combination with a ribbed former upon which the tips of hat-bodies are supported during the stretching operation, of a set of adjustable hinged stretching-fingers having their upper or inner ends closely grouped and the edge at each inner end of each finger curved in the arc of a circle of which the hinging-pin of the finger is the center, substantially as described, whereby regardless of the variations in the adjustment of said fingers for properly coöperating with ribbed formers of different sizes and in working upon hat-bodies of all sizes, a space will be assured beneath said grouped finger ends, that will conform to the apex of the ribbed former and enable the fingers and ribs to perform full stretching duty closely adjacent to the center of the tip.

5. In a hat-stretching machine, the combination with hinged stretching-fingers and their adjusting-links, of a steam-dome or bell provided with an induction-pipe, for supplying it with steam, and overlying and surrounding the stretching-fingers and their links, substantially as described, whereby during the stretching action of the fingers upon an underlying felted hat-body, the exterior of the hat-body may be kept hot and moist, and the fingers kept well heated and lubricated by moisture at their points of contact with the felt, and enabling the stretching operation to be rapidly conducted with safety to the hat-body.

6. In a hat-stretching machine, the combination with the spindle and the operative mechanism by which the ribbed former is carried, lifted and lowered, and with a brim-clamping ring carried by said spindle but provided with a bell-crank lever and links which may impart to said ring independent vertical movements, and also provided with a pendent yoke which engages with the free arm of said bell-crank lever, of a vertical lever E, which engages with said yoke and is provided with a cam-face at its upper end, an actuating-cam E' and a hinged lever E², resting on said cam and in engaging contact at its free end with the cam-face on said lever E, substantially as described, for imparting to said lever a vibrative movement and securing to the brim-clamp its independent vertical movements.

CARL EICKEMEYER.

Witnesses:
HENRY OSTERHELD,
DAVID E. LAIN.